Inventors
Richard W. Lewis
Herbert S. Jandus
Theodore J. W. Tyson
by Charles W. Hills Attys March 22, 1938.  R. W. LEWIS ET AL  2,111,596
TIRE COVER
Original Filed Aug. 16, 1930  2 Sheets-Sheet 2
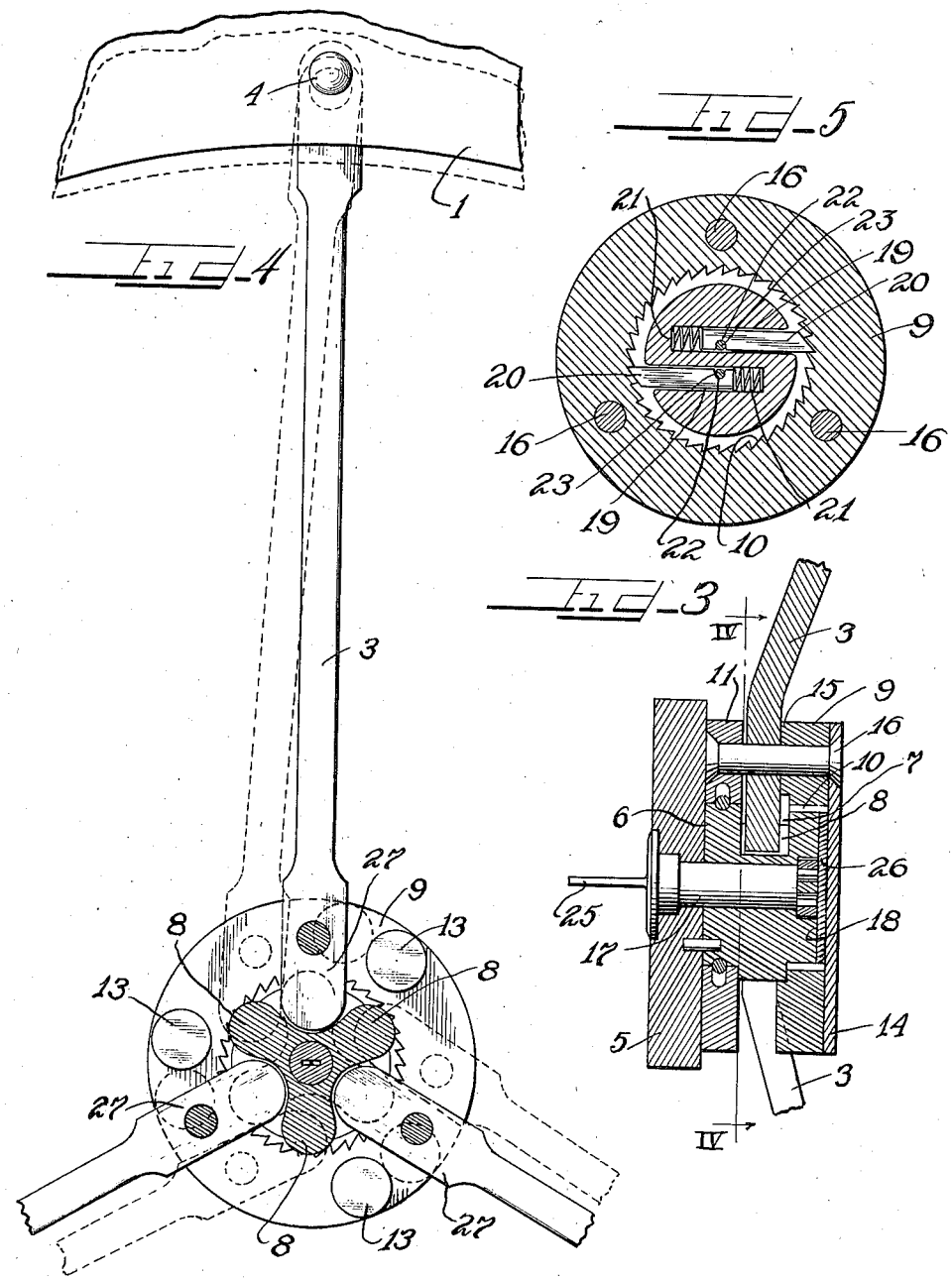
Inventors
Richard W. Lewis
Herbert S. Jandus
Theodore J. W. Tyson
by Charles M. Mills Attys Patented Mar. 22, 1938

2,111,596

UNITED STATES PATENT OFFICE 2,111,596

TIRE COVER

Richard W. Lewis, Herbert S. Jandus, and Theodore J. W. Tyson, Detroit, Mich., assignors, by mesne assignments, to Houdaille-Hershey Corporation, Detroit, Mich., a corporation of Michigan Application August 16, 1930, Serial No. 475,804
Renewed February 3, 1936

16 Claims. (Cl. 150—54)

This invention has to do with tire covers of the metallic type adapted for use in connection with spare tires of motor vehicles.

There are at present a number of metal tire covers on the market. Some of them serve to properly protect the tires on which they are mounted, but are either unsightly, complicated, very costly, difficult to place in and remove from position, or are easily stolen from the tire. These drawbacks are serious ones, and/or it is accordingly an object of our invention to provide a tire cover having none of these features and possessing all of the good qualities of the covers now in use.

In carrying out our invention, we provide a plurality of sections having spokes connected to a hub. Novel locking and adjusting means are incorporated in the hub in such a manner as to secure the cover on a tire against unauthorized removal. The means just mentioned has the additional advantage of adjusting the various sections of the cover to accommodate tires of various sizes.

Another object of the invention involves the provision of a tire cover which is equally applicable to rear and fender well spare tire mountings.

Other objects will present themselves as the description proceeds.

In the accompanying drawings:

Figure 3 is a fragmentary sectional view showing our novel construction.

Figure 4 is an enlarged view, partly in section, illustrating the locking and adjusting mechanism in detail, and taken approximately in the plane of the line indicated at IV—IV in Figure 3.

Figure 5 is a sectional view showing the ratchet locking mechanism.

Figure 1:
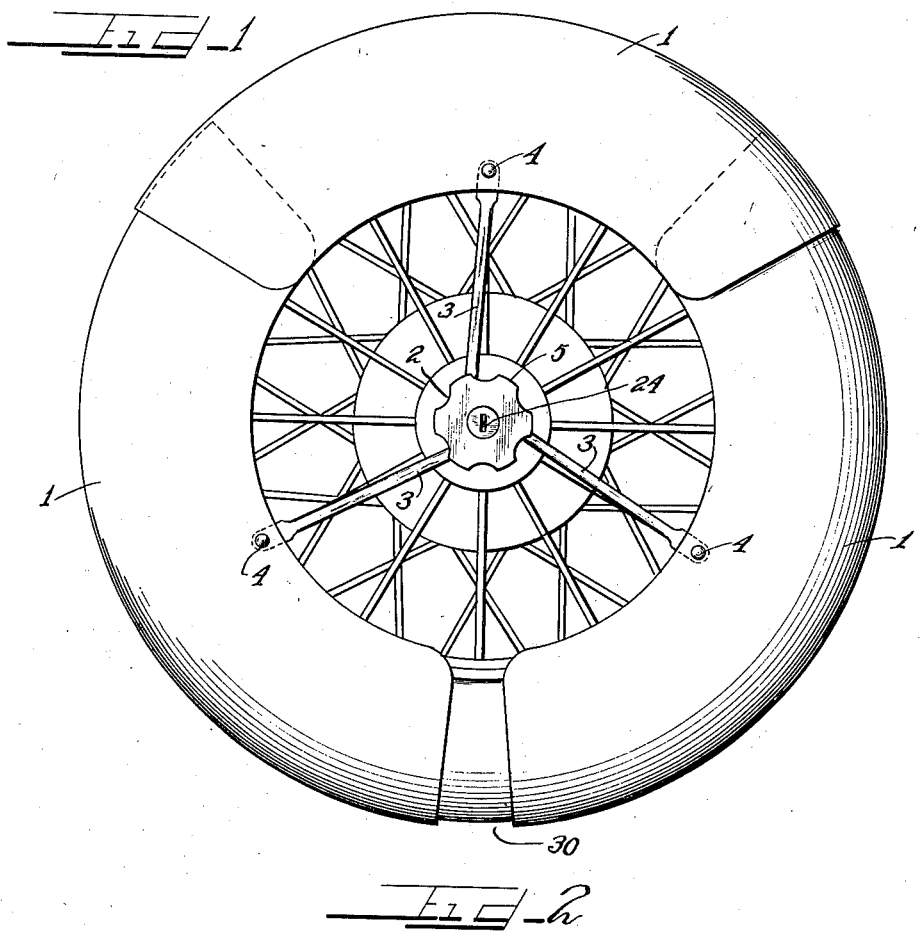
Figure 1 is an elevational view showing our improved tire cover applied in locked position on a spare tire.

Referring now more particularly to the drawings, wherein like reference characters indicate corresponding parts, the tire cover comprises primarily a plurality of sections 1, three in this case, connected to a hub generally indicated at 2, by means of spokes 3, pivotally connected at 4 to each of the sections 1. The hub 2 comprises a knob 5 having a shank 6 which is rotatable therewith and secured thereto in any suitable way to prevent their separation. The shank 6 is grooved at 7 to form three cams 8. The ring 9 surrounds the shank 6 and is provided with ratchet teeth 10 interiorly thereof. A spacer 11 is swiveled to the shank 6 and slidably engages bosses 13 of the ratchet 9. The back-up plate 14 is riveted at 16 to the ratchet 9 and ring 11 against relative rotation. The side of the ratchet 9 facing the knob 5 is cut away to provide a bearing surface for each of the spokes 3 at 15 and to provide the spacing means or bosses 13 for engagement with the ring 11.

The space between the ratchet 9 and the ring 11 is somewhat greater than the thickness of the spokes 3, through which the rivets 16 pass, so that proper pivotal movement of the spokes with respect to the hub will not be interfered with.

The knob 5 and shank 6 are centrally bored to receive a key-operated lock cylinder or tumbler means 17 adapted for rotation in said knob and shank. The inner face 18 of the shank 6 is cut away or grooved at 19 to receive spring pressed pawls normally held in engagement with the ratchet 10 by the compressed springs 21. The pawls 20 are provided with recesses 22 to receive pins 23 arranged substantially diametrically opposite each other and forming part of the lock cylinder 17. The lock cylinder 17 is provided with the usual key hole 24 to receive a key 25 which is complemental to the tumbler means. A back-up plate 26 engaging the face 18 of the shank 6 serves to hold the spring pressed pawls 20 in their respective grooves 19. If desired, however, the plate 26 could be omitted and the shank 6 extended as far as the plate 14, which would then perform the function of the plate 26.

Figure 2:
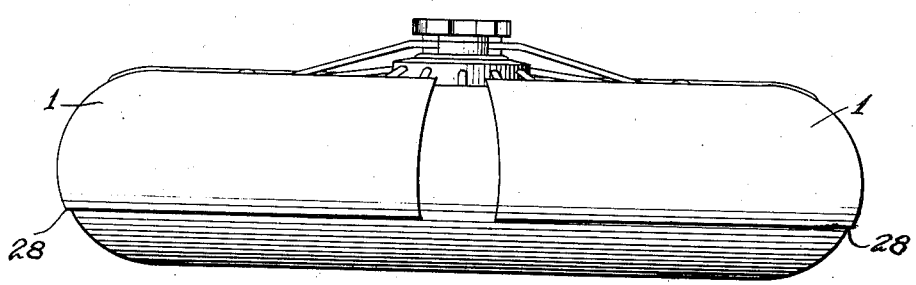
Figure 2 is a bottom view of the construction shown in Figure 1.

When the arrangement is as shown in Figure 4, the cover has its maximum diameter and may be easily slipped over the tire A, or any tire within the desired range of sizes. Once the cover is in position on the tire, the knob 5 is subjected to a counterclockwise movement as viewed in Figure 4. As a result of this movement, the cams 8 will engage the extensions 27 of the spokes 3 and cause rotary movement of the ratchet ring 9 through the medium of the rivets 16 in the same direction. Due to the pivotal connection between the extensions 27 and the ratchet 9, a certain amount of lost motion results as the extensions are forced to the left in Figure 4 by the cams 8, so that it will be evident that the angular movement of the shank 6 is greater than the angular movement of the ring 9. Accordingly, the pawls 20 will slip over the ratchet teeth 10 until movement of the knob 5 is stopped, whereupon the ratchet arrangement will inhibit retrograde movement of the parts. A glance at the dotted lines in Figure 4 will suffice to show that the movement of the spokes 3 has been such as to draw the sections 1 toward the hub 2. The tire resists further movement of the knob 5 in the direction to lock the cover on the tire, so that when the parts are as shown in Figures 1 and 2, the rear edges 28 of the sections 1 engage the tire along a diameter of the tire, which is substantially less than the maximum diameter of the tire. Thus in order to remove the tire cover, it is necessary to expand the cover until the edges 28 clear the maximum periphery of the tire at 29. This can be accomplished by an operation which will restore the spokes to the position shown in full lines in Figure 4. To accomplish this result, it is necessary merely to insert the key 25 in the opening 24 of the lock cylinder 17 and rotate said key in a counterclockwise direction, looking at Figure 1. This movement will be accompanied by withdrawal of the pawls 20 from the teeth 10 by reason of the engagement therewith by the pins 23, whereupon the knob 5 may be grasped and rotated in the opposite direction, that is, clockwise as viewed in Figure 1, until the spokes 3 are substantially radial to the hub 2. With the parts thus disposed the diameter of the periphery defined by the edges 28 of the section 1 will be substantially equal to or greater than that of the maximum periphery of the tire so that the cover may be easily removed from the tire upon axial movement away from the tire.

It will be evident from the foregoing that we have provided an extremely neat tire cover of the metallic type which may be applied to and removed from a tire in a jiffy, and may be used in connection with any size of tire within a given range. In this connection it will be noted that a space 30 is provided between adjacent sections 1 in order to insure the feature of adaptability of the cover to tires of various sizes.

Attention is directed to the fact that while the drawings depict our novel cover construction applied to a tire which is mounted on a wheel having spokes, the invention lends itself to use in connection with any wheels, whether provided with spokes or otherwise.

It will be realized that the friction between the sections and the tire will prevent slippage of the sections on the tire, so that upon turning of the hub to lock the cover in position, the only movement of the sections is toward the hub, thereby resulting in a locking of the cover on the tire.

To be sure, when the sections are manufactured definite curvatures are imparted to them, but by reason of their inherent resilience, they are capable of adapting themselves to the contour of the tire in connection with which they are used. When once the cover is tight in place, the pressure of the tire against the various sections serves to prevent rattling therebetween.

It will be appreciated that when a spare tire is in position adjacent the rear or in a fender well of the car, one side of the tire, namely that adjacent the car, is afforded a certain amount of protection by the car itself. It is, accordingly, apparent that the protection afforded the tire by the construction herein presented will suffice for all practical purposes. However, it is obvious that, if desired, the area of the sections could very well be increased to further cover the tire, and the locking and adjusting means modified accordingly.

In employing spokes in connection with a hub for adjusting and locking the cover in position on a tire, it will be appreciated that the construction could be modified to provide for the adjustment, locking and unlocking of the sections of the cover simply by movement of the hub axially in one direction or the other.

The construction herein set forth, referring particularly to Figure 4, will permit a relative movement of the members 9 and 11 of approximately sixty degrees, the bosses 13 being so located as not to interfere with the swing of the portions 27 of the spokes 3. When the spokes 3 have moved to a position at which the cams 8 have no further camming effect, the limit of the cover tightening movement has been reached. It will be noted in this connection that where a different number of sections and spokes are employed, the maximum angular movement between the members 9 and 11 will correspond. In any event, it will be appreciated that provision may be made to impart any desired limit of movement of the spokes, resulting in corresponding contraction and expansion of the cover.

We are aware that many changes may be made, and numerous details of construction may be varied through a wide range without departing from the principles of this invention, and we, therefore, do not purpose limiting the patent granted hereon, otherwise than necessitated by the prior art.

We claim as our invention:

1. A sectional tire cover having spokes, and means associated with said spokes for drawing said cover tightly on the tire, said spokes being movably connected to said cover and said means.

2. A tire cover comprising a plurality of sections, spokes connected to said sections, a hub including a pair of relatively movable members to one of which said spokes are pivotally connected, one of said members having ratchet teeth and the other having a yieldable pawl normally engaging said teeth, and means on said other member for moving said spokes relative to said one member and thereby drawing the sections against the tire, whereby said cover may be adjusted and locked on the tire on which it is mounted, against unauthorized removal.

3. A sectional tire cover, spokes mounted thereon and extending inwardly thereof, a hub to which said spokes are movably connected, whereby said hub is movable relative to the cover sections to shift the latter selectively toward and away from the tire, and means for locking the cover in adjusted position.

4. A sectional tire cover, spokes mounted thereon and extending inwardly thereof, a hub to which said spokes are movably connected, whereby said hub is movable relative to the cover sections to shift the latter selectively toward and away from the tire, and means for locking the cover in adjusted position, said means including a one-way clutch for preventing retrogression of the hub.

5. A tire cover having spokes and a hub to which said spokes are movably connected, said hub being provided with means to prevent movement of the spokes in one direction relative to the hub.

6. A tire cover having spokes and a hub to which said spokes are movably connected, said hub being provided with releasable means to prevent movement of the spokes in one direction relative to the hub.

7. A radially expansible and contractible tire cover comprising a plurality of relatively movable sections, means connected to said sections for moving the same and expanding and contracting said cover to enable the same to snugly fit tires of various sizes, and instrumentalities associated with said means for locking the cover against unauthorized expansion beyond any predetermined diameter.

8. A multi-part cover for a spare tire, said cover comprising a plurality of segments arranged in substantially circular formation, each segment having edge portions of less radius than the portion intermediate said edge portions, whereby to straddle the maximum periphery of the tire, and means for shifting all of said sections relative to their center a distance in excess of the difference in radius between one of said edge portions and said intermediate portion, whereby the cover may be removed and applied to the tire axially of the tire, said cover remaining in substantially circular form after said sections are shifted.

9. A multi-part substantially circular cover for a spare tire, said cover comprising a plurality of relatively movable segments, each segment being formed with a side portion to cover a side wall of a tire and with a rim portion to extend across the tire tread beyond the median plane thereof, the free edge of the rim portion being disposed radially inwardly adjacent the tread to hold the cover on the tire against accidental removal of the cover when the cover is in proper tire protecting position, and means operatively associated with said segments for causing their relative circumferential movement, whereby the cover at said edges may be enlarged to a diameter in excess of that of the tread to enable the edges to clear the tread axially and enable the cover to be removed from and mounted on the tire.

10. A multi-part substantially circular tire cover comprising a plurality of independent segments, each segment being formed with a side portion to cover a side wall of a tire and with a rim portion to extend across the tire tread beyond the median plane thereof, the free edge of the rim portion being disposed radially inwardly adjacent the tread to hold the cover on the tire against accidental removal when the cover is in proper tire protecting position, and means for causing relative circumferential movement of said segments whereby the diameter of the cover at said edges may be enlarged to enable the edges to clear the outer periphery of the tread and enable the cover to be removed from and mounted on the tire.

11. A multi-part substantially circular tire cover comprising a plurality of segments, each segment being formed with a side portion to cover a side wall of a tire and with a rim portion to extend across the tire tread beyond the median plane thereof, the free edge of the rim portion being disposed radially inwardly adjacent the tread to hold the cover on the tire against accidental removal when the cover is in proper tire protecting position, said segments being relatively circumferentially movable whereby the diameter of the cover at said edges may be enlarged to enable the same to clear the outer periphery of the tread and enable the cover to be removed from and mounted on the tire, and rotary means arranged substantially on the axis of the cover and having substantially radial connections with said segments, whereby the diameter of the cover is controlled by said means.

12. A multi-part cover for a spare tire, said cover comprising a plurality of segments arranged in substantially circular formation, each segment having edge portions of less radius than the portion intermediate said edge portions, whereby to straddle the maximum periphery of the tire, and means arranged substantially equidistant from said sections and connected to said sections for shifting all of said sections relative to said means a distance in excess of the difference in radius between one of said edge portions and said intermediate portion, whereby the cover may be removed from and applied to the tire axially of the tire, said cover remaining in substantially circular form after said sections are shifted.

13. A multi-part cover for a spare tire, said cover comprising a plurality of segments arranged in substantially circular formation, each segment having edge portions of less radius than the portion intermediate said edge portions, whereby to straddle the maximum periphery of the tire, and means located within the confines of the outer periphery of the cover for shifting all of said sections relative to their center a distance in excess of the difference in radius between one of said edge portions and said intermediate portion, whereby the cover may be removed from and applied to the tire axially of the tire, said cover remaining in substantially circular form after said sections are shifted.

14. A portable tire cover comprising a plurality of arcuate sections engageable with the outer periphery of a spare tire so as to be supported thereby, and means for moving said sections outwardly and inwardly so as to expand and contract and thereby vary the size of the cover to enable the same to be snugly engaged with tires of different sizes and be positioned in proper protective relation thereto, said means including a manipulating element located within the confines of the inner periphery of the cover for maintaining the cover on the tire.

15. A portable tire cover comprising a plurality of arcuate sections engageable with the outer periphery of a spare tire so as to be supported thereby, and means for moving said sections outwardly and inwardly so as to expand and contract and thereby vary the size of the cover to enable the same to be snugly engaged with tires of different sizes and be positioned in proper protective relation thereto, said means including a manipulating element located within the confines of the inner periphery of the cover and constructed and arranged so as to be operable independently of the tire to be covered for maintaining the cover on the tire.

16. In a spare tire and cover assembly including a spare tire and a wheel for carrying the tire and which wheel has a central hub, a spare tire cover extending circumferentially about the outer periphery of the tire to an extent in excess of 180° and clamping means for the cover disposed radially inwardly thereof and including a plurality of movable substantially radial clamping arms, a central connecting plate at said hub and at the inner ends of said arms to which said inner ends are connected, the outer ends of said arms being connected to said cover so as to concentrically support the cover with respect to said plate, said arms clamping said cover to said tire and means at said plate coacting with the inner ends of said arms arranged to be manualy operated to move said arms to change their relationship with respect to the plate to thereby release the cover from clamping engagement with the tire when it is desired to remove said cover from the tire.

RICHARD W. LEWIS.
HERBERT S. JANDUS.
THEODORE J. W. TYSON.